(No Model.) 4 Sheets—Sheet 1.
C. REUTHER.
GRAIN METER.
No. 261,257. Patented July 18, 1882.
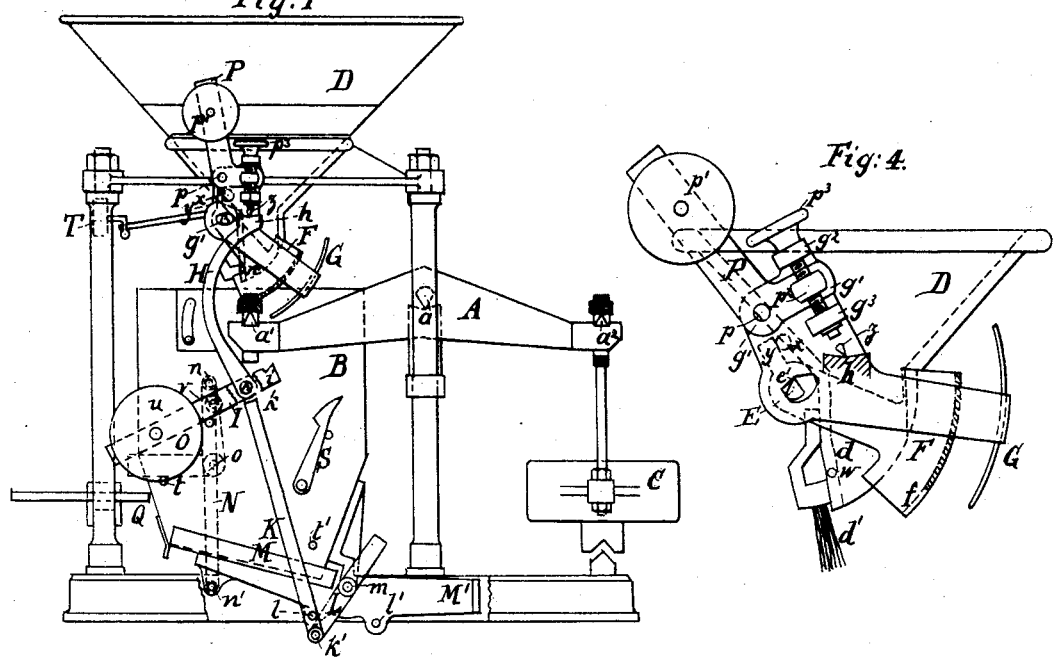
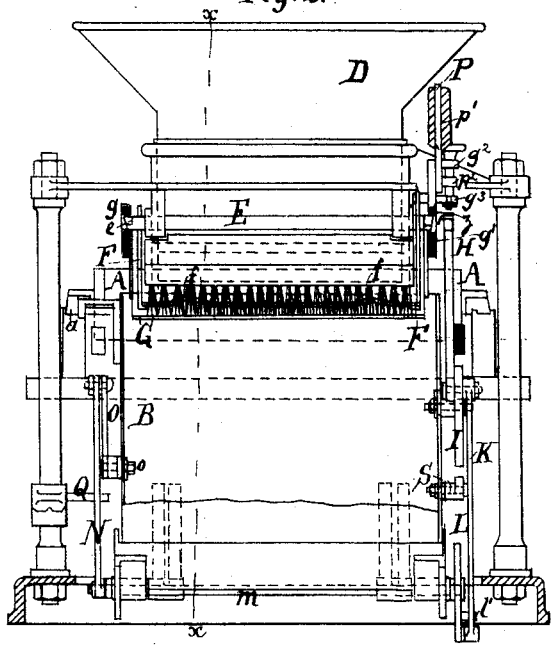
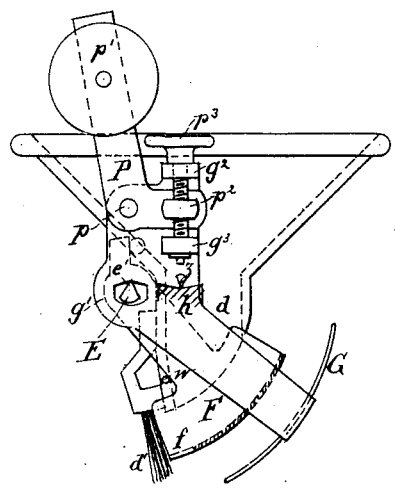
Witnesses
Inventor:

(No Model.)                  4 Sheets—Sheet 2.
C. REUTHER.
GRAIN METER.
No. 261,257.              Patented July 18, 1882.
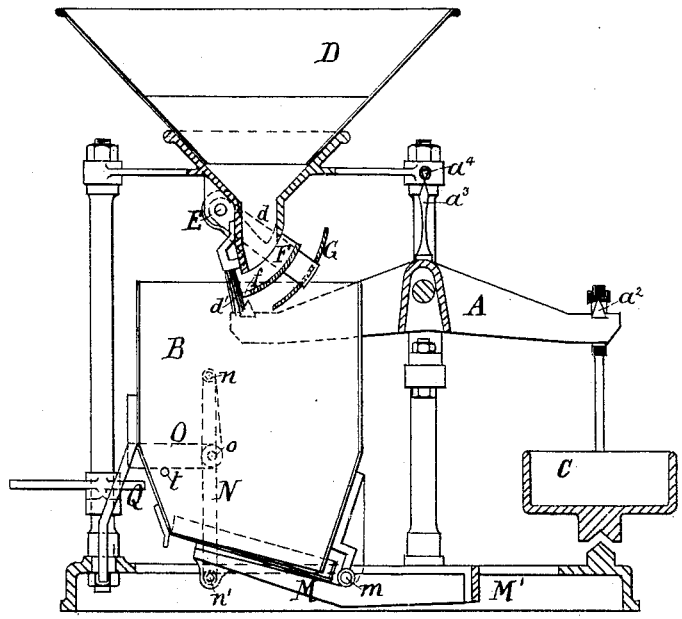
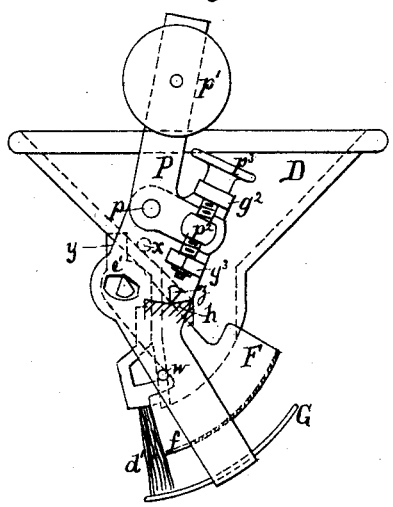
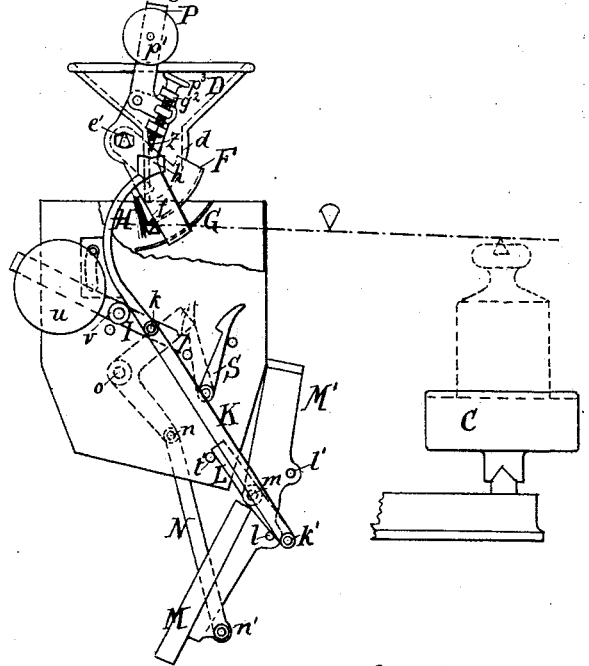
Witnesses:                                Inventor:

(No Model.) 4 Sheets—Sheet 3.

C. REUTHER.
GRAIN METER.

No. 261,257. Patented July 18, 1882.

Witnesses:
B. E. D. Stafford
H. A. Johnstone

Inventor:
Carl Reuther
by his attorney

UNITED STATES PATENT OFFICE.

CARL REUTHER, OF HENNEF, PRUSSIA, GERMANY.

GRAIN-METER.

SPECIFICATION forming part of Letters Patent No. 261,257, dated July 18, 1882.

Application filed September 27, 1881. (No model.)

*To all whom it may concern:*

Be it known that I, CARL REUTHER, a subject of the Emperor of Germany, and a resident of Hennef, in the Kingdom of Prussia, German Empire, have invented certain new and useful Improvements relating to Automatic Weighing Apparatus for Grain and other Substances, of which the following is a specification.

This invention relates to automatic weighing-machines for granular or pulverous substances or liquids, which at the same time register the quantities weighed, such apparatus consisting mainly of a double-armed lever or beam having at one end a receptacle for receiving the substance to be weighed and at the other end either a constant weight or a scale for receiving varying weights; secondly, of a feed mechanism which allows exactly as much of the material to flow into the receptacle as corresponds to the said weight, and then cuts off the supply, and after removal of the said charge opens the supply again; lastly, a mechanism for discharging the said receptacle when filled.

The accompanying drawings form a part of this specification, and represent what I consider the best means of carrying out the invention.

Figure 8:
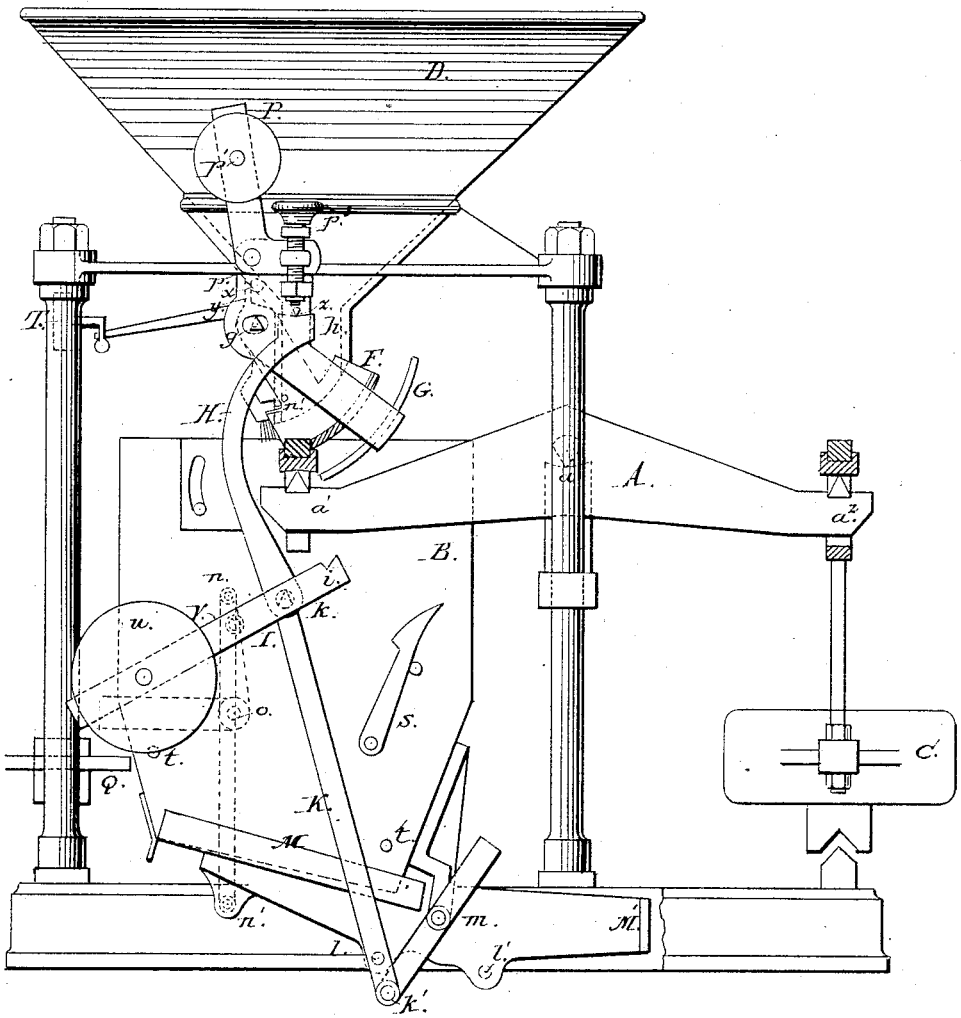
Figure 9:
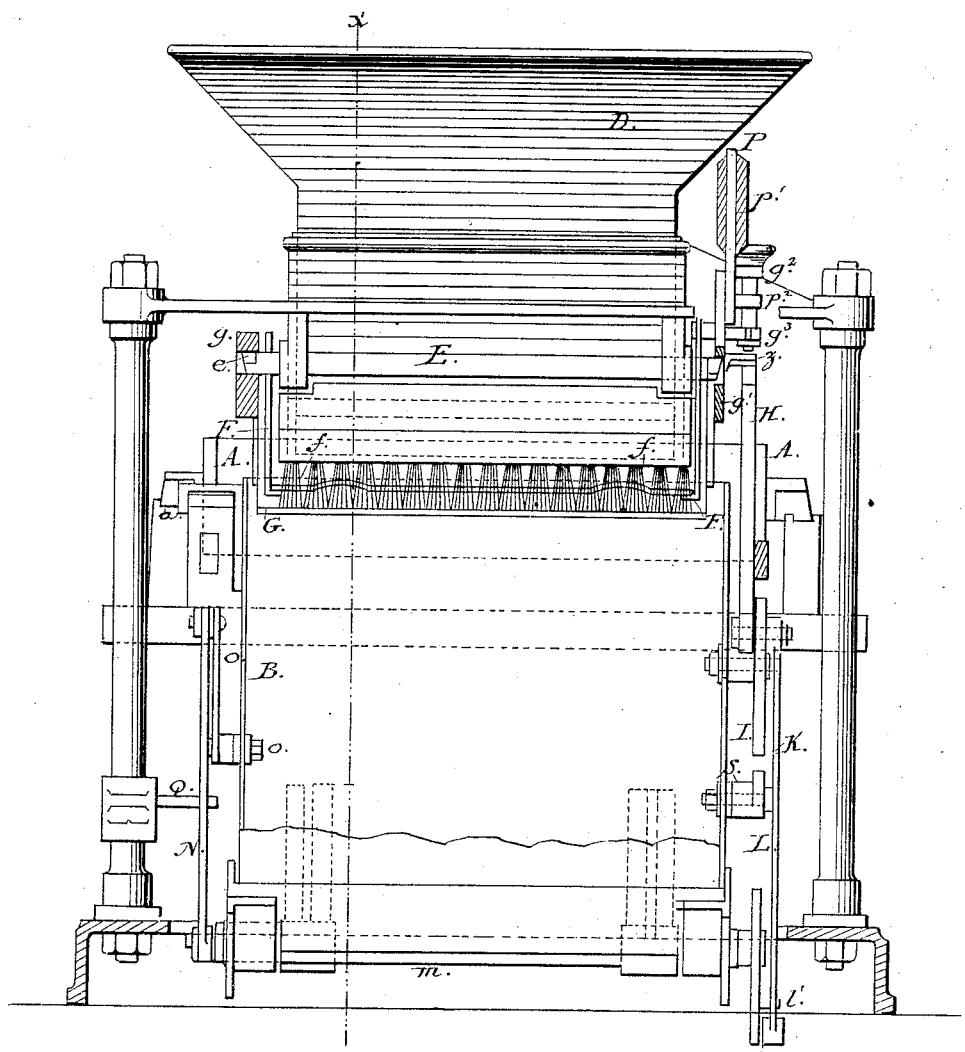

Sheets I and II of the drawings show the construction of the automatic weighing-machine for weighing granular and pulverous substances, such as grain. Figure 1 shows a side view; Fig. 2, a front view; Fig. 3, on line $x\ x$ of Fig. 2, a cross-section. Figs. 4, 5, and 6 show three different positions of the supply-regulating mechanism. Fig. 7 shows the position of the entire apparatus when the receptacle is being emptied. Figs. 8 and 9 are enlarged views of Figs. 1 and 2, clearly showing the construction and arrangement of the several parts.

Similar letters of reference indicate corresponding parts in all the figures.

A is the weighing-beam; B, the receptacle for receiving the material, such as grain; C, the tray for the weights; D, the feed-hopper, from which the grain passes through the spout $d$ into the receptacle B.

Below the spout $d$ are two swinging flaps or slides, F and G. The flap F has one, two, or more notches, $f\ f$, in its one edge, and serves to reduce the supply of grain at intervals, so that it only flows through the notches $f\ f$. The flap G, which swings beneath F, effects periodically the complete cutting off of the grain-supply. The flap F swings on the fixed axis E, and the flap G swings on two knife-edges, $e\ e'$, formed on E, by means of the steel side plates, $g\ g'$. The plate $g'$ has a knife-edge, $z$, which rests on the cup $h$ of a rail, H. If the rail H is moved up or down, the flap G swings to and fro on the knife-edges $e\ e'$.

The flap F has a projection, $y$, which rests against a stud, $x$, on the side plate, $g'$, of the flap G, so that if this is moved upward by the rail H the flap F is carried with it. The downward motion of F is limited by a pin, $w$, fixed to the hopper D. If it rests against this pin, its lower edge also rests against a brush-surface, $d'$, attached to one edge of the spout $d$, and thus the flow of grain from the hopper is stopped, with the exception of what continues to flow through the notches $f\ f$.

The rail H rests with its lower end on a knife-edge, $i$, on a lever, I, which is pivoted at $v$ to the receptacle B, and carries a weight, $u$.

A rod, K, connects the lever I with a lever, L, which is pivoted loosely upon the axis $m$ of the hinged door M, by the opening of which the receptacle is emptied.

The door M is connected by a link, N, with a bell-crank lever, O, which is pivoted at $o$ to the receptacle. If the door M is closed, the link N and lever O have the relative position shown at Fig. 1.

Assuming the receptacle B to be filled, the downward pressure on the door cannot force this open, as it will be seen that if a straight line be drawn connecting the lower end, $n'$, of the link N with the point $o$ the upper end, $n$, of N will be situated somewhat to that side of the extension of this line on which the horizontal arm of the bell-crank lever O is situated, which arm is prevented by a slot, $t$, from descending. Thus it is only when the lever O is raised from the stud sufficiently to bring the point $n$ to the other side of the line $n'\ o$ that the pressure upon the door M will be able to force it open, whereby the several parts are brought into the position shown at Fig. 7. The weight of the door M is overbalanced by a counter-weight, M', whereby the door is closed again as soon as the receptacle B is emptied. If the receptacle B is empty and there are no weights on the tray C, the weighing-beam is in balance, which is shown by the pointer $a^3$ on the beam standing opposite the index $a^4$ on the framing. If the receptacle B is empty and the tray C loaded with weights, the beam will sink on the weight side until the tray rests on the base-plate. In this position, assuming the lever I to be in the position at Fig. 1, the bar H presses with its cup $h$ upward against the knife-edge Z of the flap G, so as to hold both this and the flap F in the open position, as shown at Fig. 4. The spout $d$ being now open, the grain flows into the receptacle B. As the latter becomes filled the beam will begin to move before the vessel has received its full charge, corresponding to the weights on the tray, because the receptacle is loaded with the additional weight of the flaps F G resting with the knife-edge Z upon the bar H. The beam, with the receptacle, will descend until the flap F rests against the stud $w$, as at Fig. 5, whereupon the receptacle and beam will be relieved of the weight of F, G however still bearing upon them. In this position the flow of grain is cut off, all but the small streams issuing through the notches $ff$, and this continued small flow will cause the receptacle and beam to sink still farther, whereupon the flap G will also descend, so as to pass with its edge over the edge of the brush-surface $d'$, and thus entirely intercept the flow of grain, as shown at Fig. 6.

To the side plate, $g$, is pivoted at $p$ a bell-crank lever, P, having a weight, $p'$. This lever P is so arranged that while the small streams are issuing through the notches $ff$ the center of gravity of the flap G, with all its connections, is situated above the knife-edges $e\ e'$ and only slightly to the right of the vertical line passing through $e'$. By this means, as the flap G moves down to cut off the supply, its action upon the weighing-beam will become increased as the leverage of the center of gravity of the flap increases during its motion, so as to impart rapid downward motion to the beam on the side of the receptacle. As the receptacle sinks the horizontal arm of the bell-crank lever O comes in contact with an arm or stop, Q, on the framing of the machine, whereby it is raised, bringing the point $n$ to the right of the line passing through $n'\ o$, and the door M being now free to yield to the pressure of the contents of B, the latter will become emptied.

The door M has two studs, $l$ and $l'$, of which the former presses on the opening of the door against the lever L, thereby throwing it, together with the rod K, lever I, and rod H, into the position shown at Fig. 7. In this position the several parts remain until the receptacle is emptied, whereupon the door M in closing causes the stud $l'$ to bear against the lever L so as to throw it over into its former position, thereby allowing the weight $u$ to bring the parts H, I, K, and L into the position shown at Fig. 1.

If in the position at Fig. 7 a straight line be drawn through $kk'$, this line will pass slightly to the right of the pivot $m$ of the door M, so that the weight $u$ tends to move the point $k$ still farther to the right, this being, however, prevented by the lever L bearing against a stud, $t'$. As soon as the receptacle B is emptied the weighing-beam, being freed from the weight of the charge of grain, will at once swing back into its original position. The opening of the two supply-flaps will, however, not take place until the pin $l'$ has thrown the lever L over again—that is, until the door M has closed the receptacle—because by the bringing of the parts into the position at Fig. 7, on the opening of the door the bar H, with its cup $h$, is moved down a greater distance than that through which the beam passes in ascending.

It should be noted that the weight on the lever I is sufficiently heavy to overcome the resistance which the flaps F and G offer to the upward or opening movement. The beam A has all the properties of a regulation weighing-beam. The two arms are perfectly equal, the double knife-edges $a'\ a$ and $a^2$ lie in one and the same plane, and the center of gravity of the beam is situated below the line connecting the two knife-edges. If, therefore, the empty receptacle is of the same weight as the empty weight-tray, the tongue $a^3$ of the beam will be exactly in the central position. If weights are placed in the tray and the receptacle B is filled to such an extent with grain as is equal to the weights, the tongue $a^3$ will also be accurately central.

The complete cutting off of the supply to the receptacle B must not take place at the precise moment when the weight of the charge is exactly equal to the weights on the tray, because in that case an incorrect result would be obtained—that is, the supply of grain to each charge would be too great—because, first, the cutting off cannot take place instantaneously, but always requires an appreciable amount of time, during which grain will continue to flow down into the weighed quantity in the receptacle; and, secondly, even after the cutting off is completed a stream of grain is still falling through the space between the flap G and the surface of the grain in the receptacle, which also goes to increase the weight of the charge. The complete cutting off of the supply must therefore be effected before a complete balance has been effected, and this must be exactly so much in advance as is necessary for the receptacle B to receive the exact charge equal to the weights on the balance.

As already stated, the receptacle B is loaded during the small supply through the openings $ff$, with the pressure exerted by the flap G upon the cup $h$ by the knife-edge Z. The beam will consequently commence to sink on the receptacle side before having received the full charge, and this exactly as much sooner as corresponds to the extra weight put upon it by the flap G. This pressure must be capable of being readily increased or decreased, in order that the weighing-machine may be rapidly adjusted, so that each complete charge shall be exactly equal to the weights on the tray. The adjustment of this pressure is effected by altering the position of the weight $p'$ relatively to the flap G, whereby of course the position of the center of gravity of the whole—namely, the flap G and the weight $p'$—is altered. For this purpose the lever P is cranked, the lower arm having a screw-nut, $p^2$, pivoted to it, through which passes a screw, $p^3$, carried in lugs $g^2$ $g^3$, fixed to the plate $g'$ on each side of the arm of P. Thus by turning the screw $p^3$ in one direction or the other the weight $p'$ will be adjusted in position relatively to the flap G.

The catch S serves to put the machine out of action. If this catch be moved into the dotted position, Fig. 7, it catches on the lever I, and consequently, although the door M may be closed, the lever I and bar H, with cup $h$, cannot return to the position Fig. 1, and the supply therefore remains cut off. The beam A can now oscillate, with its tongue $a^3$ playing to either side of the index $a^4$, without causing the cup $h$ to touch the knife-edge Z.

If it is desired to ascertain whether the machine is in proper order for weighing accurately, the beam must be allowed to play as above described with the receptacle B and tray C empty, the catch being made to hold the lever I, as described, so that the beam with receptacle and weight-tray are free to play to and fro without coming in contact with the other parts.

If it be desired to ascertain whether the grain charged automatically into the receptacle B is accurately of the same weight as the weights on the tray C, the arm or stop Q must first be turned to one side, so as to prevent the bell-crank lever O from coming in contact therewith so as to open the door; also, I must be secured by the catch S. If the charge of grain is exactly equal to the weights, the tongue $a^3$ will stand accurately at the index $a^4$. If this is not the case, the screw $p^3$ must be turned so as to alter the pressure of the flap G on the beam A, the pressure being increased if the charge of grain is too heavy (in order that supply may be cut off sooner) and decreased if the charge is too light. In the first case, therefore, the weight $p'$ must be moved more to the right and in the second case more to the left. By the loading of the beam with the weight of the flap G no friction is produced, as the flap hangs in knife-edges $e$ $e'$ and rests with its weight upon the cup $h$, also by means of the knife-edge Z, while the bar H, which receives the pressure, also rests with the knife-edge $i$ on the lever I.

The flap is not in contact with any other parts while the grain is flowing through the openings $f f$, and on completion of the charge it swings freely beneath the bush-surface $d'$, and thus intercepts the small streams of grain falling through the openings $f f$. If, therefore, after correct adjustment of the weight $p'$ the weighing-machine is in proper order, so that it correctly fills and weighs one charge, every other subsequent charge will be correct.

The counter T counts each discharge of the receptacle B by being actuated by a rod or arm attached to the flap G, this connection being, however, such that no friction takes place, the arm being made only to come in contact with the counter when the flap has cut off the supply.

I reserve the right to make separate application for patent for the apparatus for weighing liquids which originally formed part of this present application.

I claim—

1. In a weighing-machine, the flap or pan G for cutting off the flow of grain, swung from fixed pivots and having knife-edges or pivots Z provided on the ends thereof, in combination with the lever H and connections to the grain-receptacle door, substantially as set forth.

2. The combination of the cut-off flap or pan G with the partial pan F, swung upon the same center as, working above, and controlled by, the flap G, whereby the flow of grain is first partially checked by the interposition of the flap F, and then wholly stopped by the flap G, as set forth.

3. The combination, with the flap G and its connections to the door of the grain-receptacle, of the weight $p'$, mounted upon an adjustable lever above the flap G in such a manner as to retard the movement of the flap G for a time and then allow it to swing shut suddenly, whereby the flow of grain is cut off a little in advance of the complete filling of the receptacle, so that the grain then falling will exactly complete the filling, as set forth.

4. In a weighing-machine, the combination of the lever H, rod K, lever L, and door M with the pivoted lever I, connected at one end with the lever H and rod K and provided at the other end with the weight $u$, substantially as set forth.

5. In the weighing-machine for granular and pulverous substances, the combination of the bell-crank lever O and rod N with the door M for controlling the opening of the latter.

6. In the weighing-machine for granular and pulverous substances, the combination of the bar K and levers I and L, operating together, with the studs $l$ and $l'$, whereby the lever I, and consequently the bar H, that operates on flaps, are brought into and maintained in the lowered position while the door M is open.

In testimony whereof I have hereunto set my hand, at Cologne, Prussia, in the presence of two subscribing witnesses.

CARL REUTHER.

Witnesses:
EDUARD REISERT,
JACOB AUGUST SCHMIDT.